United States Patent [19]

Kuntschik et al.

[11] 3,764,622

[45] Oct. 9, 1973

[54] PURIFICATION PROCESS
[75] Inventors: Lawrence F. Kuntschik, Nederland; Orville W. Rigdon, Groves, both of Tex.
[73] Assignee: Texaco Inc., New York, N.Y.
[22] Filed: July 14, 1969
[21] Appl. No.: 841,549

[52] U.S. Cl. ............................................. 260/566 A
[51] Int. Cl. ............................................ C07c 131/00
[58] Field of Search .............................. 260/566 A

[56] References Cited
UNITED STATES PATENTS
| | | | |
|---|---|---|---|
| 2,562,205 | 7/1951 | Zlin et al. | 260/566 |
| 2,696,505 | 12/1954 | Welz et al. | 260/566 |
| 2,721,219 | 10/1955 | Welz | 260/566 |
| 2,822,394 | 2/1958 | Nicolaisen et al. | 260/566 |
| 2,885,332 | 5/1959 | Mueller et al. | 204/158 |
| 3,197,505 | 7/1965 | Jori | 260/566 |

*Primary Examiner*—Leon Zitver
*Assistant Examiner*—Gerald A. Schwartz
*Attorney*—K. E. Kavanagh and Thomas H. Whaley

[57] ABSTRACT

This invention concerns a process for purifying crude oximes containing carbonyl and/or chlorine contaminants comprising treating said crude oximes with a basic reagent such as the metal oxides, carbonates and alcoholates of Groups IA and IIA of the Periodic Table to decompose the contaminants and separating the purified oxime from the impurities preferably by molecular distillation.

8 Claims, No Drawings

PURIFICATION PROCESS

This process concerns a process for purifying crude oximes containing substantial quantities of carbonyl and/or chlorine contaminants by treatment with a basic reagent.

More particularly, this invention relates to a process wherein a crude oxime product, derived from a photolytic nitrosation process if freed from substantial quantities of carbonyl-type and organic chlorine impurities by contact with a basic reagent.

BACKGROUND OF THE INVENTION

Oximes are useful as organic intermediates and for various other applications. For example, they undergo the Beckmann rearrangement, can be alkoxylated and hydrogenated, and are useful as lubrication additives, anti-icing additives and some oximes can be converted to synthetic fibers (i.e., cyclohexanone oxime can be hydrolyzed into caprolactam, an intermediate for the commercial preparation of Nylon 6).

Paraffinone oximes have been prepared by the base catalyzed reaction of ketones with hydroxylamine salts and more recently by the photolytic nitrosation of normal paraffins. Both of these synthetic methods can produce a crude product which contains substantial quantities of contaminants boiling close to or overlapping the boiling points with the oxime product. Most of these impurities encountered in both processes are aldehydes or ketones (which are referred to generically as carbonyl-type or impurities), while in the photolytic process gem-nitrosochlorides and gem-nitrosochloride condensation products can also cause separation problems. In any event, conventional distillation preceded or followed by extraction has failed to produce high purity (i.e., 98 percent or higher) products.

In view of the separation difficulties presented by these impurities there is a need for a purification procedure directed to the purification of paraffinone oximes containing substantial quantities of carbonyl-type and organic chlorine impurities. Particularly useful would be a simple treatment which would utilize as starting material a crude oxime product derived from the photolytic nitrosation of n-paraffins such as disclosed in Ser. No. 674,612 filed Oct. 11, 1967, now U.S. Pat. No. 3,578,575, and which contains substantial quantities of carbonyl-type and/or organic chlorine impurities. Desirably, the purification procedure would utilize the 95 percent and lower oxime content product of the above application and convert it to a product of 98 percent and higher oxime content. Ideally, the novel process would be relatively inexpensive, would require no particular expertise and would utilize commercially available equipment.

OBJECTS OF THE INVENTION

It is therefore an object of this invention to purify crude oximes containing substantial quantities of carbonyl-type and organic chlorine impurities.

It is a more specific object of this invention to treat crude oxime products containing substantial quantities of carbonyl-type and/or organic chlorine impurities so that the impurities are substantially decomposed.

The most specific object of this invention is to convert a crude oxime product of 95 percent or less oxime content, the residuum being carbonyl-type and organic chlorine impurities, to a highly purified oxime product of 98 percent and higher oxime content, substantially free from carbonyl-type and organic chlorine impurities.

The above objects are achieved by the novel process described below.

BRIEF DESCRIPTION OF THE INVENTION

In practice, an oxime product, however derived, contaminated with substantial quantities of carbonyl-type and/or organic chlorine impurities is treated with a basic reagent until said impurities are decomposed and separating the purified oxime product from the decomposed impurities.

In the favored practice, a paraffinone oxime product containing from five to 30 or more carbon atoms, having an oxime content of 95 percent or less, and containing a substantial quantity of carbonyl-type and organic chlorine impurities, is treated at ambient to elevated temperatures with anhydrous basic reagents, until the impurites are decomposed, then separating the oxime from the decomposed contaminating impurities by molecular distillation to produce an oxime substantially free from said impurities.

In the preferred practice, a crude oxime product derived from the photolytic nitrosation of n-paraffins, and containing from 10 to 15 carbon atoms, said product having an oxime content of 95 percent or less, and containing up to 5 percent or more of carbonyl-type and organic chlorine impurities, is first treated with from 1 to 20 percent by weight (based on the oxime content) of anhydrous base reagent selected from the group consisting of alkali metal and alkaline earth metal carbonates and alkaline earth oxides, at near atmospheric pressures, at temperatures ranging from 85° to 125° C. for 2 to 6 hours, to substantially decompose the impurities. Then inert solvent is added to the base-treated oxime, to facilitate the separation of oxime (i.e., by filtration, etc.), and the oxime is separated from solids and distilled under modecular distillation conditions sufficient to keep the concentration of carbonyl-type and organic chlorine impurities from substantially increasing.

DETAILED DESCRIPTION OF THE INVENTION

In order to aid in the understanding of the inventive process, the following additional disclosure is submitted.

A. Paraffinone Oxime Product — Any oxime, particularly paraffinone oxime products containing at least five carbon atoms up to 30 or more carbon atoms, can be utilized as charge stock as long as it contains substantial quantities of carbonyl-type and/or organic chlorine impurities. The favored oximes are the linear and cyclic crude oximes such as the hexanone oximes, the cyclohexanone oximes, the heptanone oximes, the octanone oximes the nonanone oximes, the decanone oximes, the undecanone oximes, the dodecanone oximes, their higher homologues and/or mixtures thereof. The preferred oximes are crude cyclohexanone oxime and the paraffinone oximes containing 10 to 15 carbon atoms of 95 percent or less oxime content. They can be in the form of the relatively dry, crude single oxime product, free from inert solvent, or as mixtures of the oximes having 10 to 15 carbon atoms, either relatively free from solvent or containing up to 25 percent by weight of inert solvent. The $C_{10}$ to $C_{15}$ group of oximes, whether solvent-free or not, are preferred because they are available in large quantities from the nitrosation of the corresponding paraffins as described in Ser. No. 674,612 Oct. 11, 1967.

B. Base — The basic substances used in the novel treatment of this invention are the anhydrous oxides, hydroxides, carbonates and alcoholates, preferably of Groups IA and IIA of the Periodic Table. Illustrative bases are calcium oxide, magnesium oxide, sodium carbonate, potassium carbonate, lithium carbonate, sodium hydroxide, potassium hydroxide, sodium methoxide, sodium ethoxide, potassium methoxide, potassium ethoxide, and the like. The preferred basic reagents are selected from the anhydrous oxides and carbonates of the alkaline earth metals and the anhydrous carbonates of the alkali metals. These basic reagents are employed at from 1 to 20 percent by weight concentration levels based upon the oxime content, preferably between 5 and 10 percent.

C. Reaction Conditions

1. Temperature — The reaction temperatures required for the inventive process are relatively flexible, ranging from about 25° to 200° C. In view of the fact that the best results have been obtained between about 85° to 125° C., these temperatures represent the preferred range.

2. Pressure — Ordinarily atmospheric or near atmospheric pressures are employed. Since no apparent advantage results from the use of super- or subatmospheric pressures and these pressures are more costly to maintain, atmospheric pressures are preferred.

3. Reaction Time — The reaction time varies according to the reaction temperature and concentration of base used, as well as the size of the batch being treated, and for these reasons cannot be defined precisely. However, under most conditions the reaction will be completed within 0.1 and 12 hours of treatment with longer times no being harmful. Under the more usual reaction conditions the reaction will be complete within 2 to 6 hours.

4. Separation of Solid Materials — The separation of solid materials may be facilitated by the addition of one or more inert solvents to the reaction mixture. Ordinarily the inert solvent is added subsequent to treatment of the oxime with basic material to facilitate the removal (by filtration, centrifugation, etc.) of solids. When inert solvent is added at this time, any alkane, cycloalkane, arylalkane, aromatic, alcohol or ketone that does not substantially dissolve the basic material may be employed. The favored solvents are alkanes, cycloalkanes, alcohols containing five to 10 carbon atoms and ketones containing three to eight carbon atoms. Acetone is the preferred inert solvent when added subsequent to base treatment. If it is desired to add the inert solvent prior to the treatment with base, then only hydrocarbon solvents such as alkanes, cycloalkanes, arylalkanes or aromatics should be employed. In any event, the inert solvent should be removed prior to the distillation under high vacuum.

D. Process Conditions — As described supra, the gist of this invention is the discovery that the oxime content of crude oximes can be substantially increased with a corresponding decrease in carbonyl-type and organic chlorine impurities by treating the crude oxime with certain anhydrous or substantially anhydrous basic substances. This is particularly the case of crude oximes containing 95 percent or less oxime content, which are derived from the photolytic nitrosation of the corresponding n-paraffins. Peculiarly enough, while the inventive treatment results in an increase of 98 percent of greater oxime content with a carbonyl-type plus organic chlorine impurities totaling less than 2 percent, this increase in purity and decrease in impurities cannot be maintained if the separation of oxime from impurities is done using conventional vacuum distillation even as low as 0.4 to 2.0 mm of mercury. However, when the purified, treated and filtered oxime product is distilled using molecular distillation techniques such as continuous film vacuum distillation (CFD), the purity and impurity level remains substantially unchanged. For this reason, the preferred aspect of this invention comprises:

1. Contacting the neutralized crude oxime containing 95 percent or less oxime content with five to 10 percent by weight of anhydrous basic reagent (based upon oxime content) selected from the group consisting of alkaline earth metal oxides and carbonates and alkali metal carbonates, for 2 to 6 hours at 85° to 125° C. to substantially decompose the aforementioned impurities, then 2. Adding inert solvent and separating solid material by filtration, centrifugation and the like, removing inert solvent, then 3. Subjecting the clarified oxime-decomposed impurities mixture to continuous film vacuum distillation under conditions sufficient to substantially retain the concentration level of carbonyl-type and organic chlorine impurities unchanged.

E. Sufficiently Mild Vacuum — as described previously, the base treatment of the neutralized crude oxime is preferably followed by distillation under high vacuum to preserve the high purity of the treated oxime. By sufficiently mild Vacuum is meant distillations carried on at less than 1 mm of mercury. While no particular mode of vacuum distillation is required, especially good results have been obtained using molecular distillation techniques and for this reason these techniques are favored. Molecular distillations as used herein refers to those distillation means where the vapor path of the molecules being distilled is unobstructed and the condenser in the apparatus is separated from the evaporation by a distance less the mean free path of the evaporating, emerging molecules. While molecular distillation techniques are favored, as is frequently the case where a broad class is employed, a more specific technique or process within the broad class is preferred for one reason or another. In the instant case, distillation within a molecular pot still is preferred since it preserves the low contaminant level of the treated oxime substantially unchanged. These type of distillations can be carried out in a variety of apparatus at vacuums ranging from 0.001 to 0.0001 mm of mercury. Two types of commercially available molecular stills which are widely used employ either centrifugal or continuous (or falling) film techniques. Illustrative stills are described in detail in Chapter 17, pages 29–32, of the Chemical Engineering Handbook by Perry, Chilton and Kirkpatrick, 4th Edition, published by McGraw Hill Inc., New York, N. Y., among other publications.

Having described the inventive process in general terms, the following examples and embodiments are submitted to supply more detailed illustrations of its workings.

Embodiment A — Preparation of a Crude Mixed $C_{10}$-$C_{13}$ Paraffinone Oxime Product Containing Substantial Quantities of Carbonyl-Type Impurities:

A 22.981 kg portion of mixed $C_{10}$-$C_{13}$ n-paraffins is charged to a photoreactor equipped with heating and cooling means and a means of directing a light source with excludes wave lengths below 200 millimicrons. The paraffin mixture is reacted with excess of gaseous nitrosyl chloride at 60° F. in the presence of gaseous hydrogen chloride at flow rates of 1.64 grams per minute and 0.95 grams per minute, respectively. After separation of the crude oxime-acid salt, the acid was neutralized with aqueous ammonia and the crude $C_{10}$-$C_{13}$ oxime mixture is separated. The molar selectivity to crude oximes was 87.4 percent with an overall recovery of 90.7 percent by weight oxime. The crude oxime product contained about 2 percent by weight of $C_{10}$-$C_{13}$ ketones.

Example 1 — Attempted Purification of Neutralized Crude $C_{10}$-$C_{13}$ n-Paraffinone Oxime Mixture Using Conventional Vacuum Distillation:

An 800-gram crude mixture of $C_{10}$-$C_{13}$ n-paraffinone oxime prepared as in Embodiment A and containing 4.3 percent by weight of ketones and 0.41 percent by weight chlorine is batch vacuum fractionated at 0.4 to 0.6 mm of mercury on an 18 inches Hempel column packed with 1/4 inch protruded stainless steel packing in the presence of 100.0 grams of 700° F. hydrocarbon chaser. The following summarizes the results:

| Fraction No. | 1 | 2 | 3 | 4 | 5 | 6 | 7 |
|---|---|---|---|---|---|---|---|
| Boiling point, °C. | 100 | 110 | 108 | 108 | 112 | 120 | 130 |
| Pressure, mm. Hg | 0.5 | 0.6 | 0.4 | 0.4 | 0.4 | 0.5 | 0.6 |
| Weight, grams | 6.0 | 74.0 | 164.1 | 204.3 | 101.2 | 37.0 | 58.2 |
| Percent by weight of ketones in fraction > | 50 | 19 | 13 | 9 | 13 | 19.5 | 30 |

As the increase in ketones (>175 percent by weight increase) indicates, conventional vacuum distillation without treatment by basic reagents worsens the purity of oxime product. The distillate product exhibited a hazy appearance.

Example 2 — Attempted Purification of Crude $C_{10}$-$C_{13}$ n-Paraffinone Oxime Mixture Using Continuous Thin Film Distillation Without a Preceding Treatment with Base:

A 90 gram portion of crude $C_{10}$-$C_{13}$ paraffinone oxime prepared as in Embodiment A and containing 3.6 percent by weight of ketones and 1.15 percent by weight of chlorine, is charges to a 2 inches Rodney Hunt Vaca-Film Processor sold by Rodney Hunt Machine Co. (currently sold by Arthur F. Smith Co.), and heated to 100 to 105° C. at 0.3 mm Hg pressure. A light colored oxime distillate (67.0 grams) containing 2.6 percent by weight of ketones and 0.93 percent by weight of chlorine is obtained. The product exhibited an undesirable hazy appearance.

This example demonstrates that without the novel preceding base treatment, continuous thin film distillation is not an effective means of substantially removing carbonyl-type and organic chlorine impurities from the neutralized crude oxime.

Example 3 — Substantial Reduction of Carbonyl-Type and Organic Chlorine Impurities Contained in Crude Mixtures of $C_{10}$-$C_{13}$ Paraffinone Oximes Using the Preferred Process Wherein Anhydrous Calcium Oxide is the Basic Reagent:

A 500 gram mixture of $C_{10}$-$C_{13}$ paraffinone oximes prepared as in Embodiment A, containing 2.0 percent by weight of ketones and 0.51 percent by weight of chlorine is thoroughly mixed with 100 grams of anhydrous calcium oxide in a reaction vessel heated to 100° C. for 2 hours. After vacuum filtration, the oximes (435 grams) contained less than 0.5 percent by weight of ketones, and 0.42 percent by weight of organic chlorine. This substantial reduction of impurities is illustrative of the efficacy of the inventive base treatment.

The calcium oxide-treated oxime mixture is exposed to continuous film distillation at 98° to 100° C. at 0.4 mm of mercury on the apparatus described in Example 2. A light colored oxime mixture (69 grams) containing less than 0.5 percent by weight of ketone and 0.23 percent by weight chlorine is obtained. This example demonstrates the efficacy of the preferred process in substantially reducing impurity content as well as the use of alkaline earth metal treating agents as the basic reagents.

The same results as obtained using a centrifugal-type molecular still.

Example 4 — Substantial Reduction of Carbonyl-type and Organic Chlorine Impurities Using the Preferred Process Wherein Anhydrous Sodium Carbonate is Employed as the Basic Reagent:

A 500 gram portion of crude $C_{10}$14 $C_{13}$ n-paraffinone oximes prepared as described in Example 1 and containing 2.3 percent by weight of ketones and 0.93 percent by weight of chlorine are thoroughly mixed with 100 grams of anhydrous $Na_2CO_3$ at 100° C. for 2 hours. The purified oxime (406.5 grams) obtained after vacuum filtration contained less than 1 percent by weight of ketone and 0.78 percent by weight of organic chlorine.

After thin film distillation in the apparatus of Examples 2 and 3 at 100° to 105°C. at 0.15 to 0.35 mm Hg pressure, a light colored oxime (307.6 grams) is produced that contains less than 1 percent by weight of ketone and 0.41 percent by weight of chlorine.

This example demonstrates that anhydrous alkali metal carbonates are effective base treating reagents.

Example 5 — Substantial Reduction of Carbonyl-Type and Organic Chlorine Impurities Using the Preferred Process Wherein Inert Solvent is Utilized:

A 500 gram portion of a neutralized crude $C_{10}$-$C_{13}$ oxime mixture prepared as in Embodiment A, containing 2.3 percent by weight of ketone and 0.93 percent by weight of chlorine is mixed as before with 25 grams of anhydrous calcium oxide and heated to 100°C. for 2 hours. After cooling, the reaction mixture is diluted with 1,300 grams of mixed heptanes and washed three times with equal volumes of water. The solution is filtered and stripped in vacuum of the heptanes. An oxime product (376 grams) is obtained substantially free from ketone contamination.

A 6.8 gram portion of the treated oxime is distilled on a continuous thin film distilling apparatus at 100° to 125° C. at 0.25 mm Hg pressure producing a light colored oxime substantially free of ketone contaminants.

This example demonstrates the use of the preferred process in the presence of large quantities of inert solvent.

Example 6 — The Process of Example 5 Wherein the Reaction Mixture is Diluted with Inert Solvent Prior to Filtration:

The procedure of Example 5 is followed except that 25 grams of $Na_2CO_3$ is mixed with 500 grams of the same crude $C_{10}$–$C_{13}$ oxime, and one liter of the heptanes is added prior to filtration. The initial ketone concentration is reduced from 2.3 percent by weight to less than 1 percent by weight and chlorine from 0.93 to 0.55 percent by weight chlorine. Continuous thin film distillation of 341.9 grams at 100° to 105° C. at 0.2 to 0.3 mm of Hg on the preceding example's apparatus yields a light colored oxime (2.98.4 grams) containing less than 1 percent by weight ketones and 0.42 percent by weight chlorine.

Example 7 — Repeat of the Procedure of Example 6 Utilizing Cyclohexane as Inert Solvent Prior to Filtration:

In this example 500 grams of the neutralized $C_{10}$–$C_{13}$ oxime mixture of Example 5 is heated with 25 grams of anhydrous $Na_2CO_3$ for 3 hours at 100° C. After cooling as in Example 5, the reaction mixture is diluted with 1 liter of cyclohexane and filtered. The solvent is stripped off under vacuum leaving an oxime product (417 grams) containing less than 1 percent by weight ketone (compared to an original 2 to 3 percent by weight) and 0.51 percent by weight chlorine (compared to an original 0.93 percent by weight concentration). The stripped oxime mixture is distilled on the CFD apparatus previously alluded to at 100° to 105° C. at 0.2 to 0.3 mm Hg pressure to produce 220.9 grams of distillate containing less than 1 percent by weight ketone.

Example 8 — Repeat of Example 7 Using Acetone as Inert Diluent:

In this example 500 grams of a crude neutralized mixture of $C_{10}$–$C_{13}$ n-paraffinone oximes containing 2.6 percent by weight of ketone and 1.05 percent by weight of organic chlorine is heated with 50 grams of anhydrous $Na_2CO_3$ at 100° C. for 4 hours. The mixture is diluted with 1 liter of acetone, filtered and stripped of acetone under vacuum to produce 428 grams of a treated product containing less than 1 percent by weight of ketones and 0.91 percent by weight of organic chlorine.

Using the CFD unit previously described, a 158.8 gram portion of the treated oxime misture is distilled at 95° to 115° C. at 0.05 to 0.1 mm Hg pressure to produce a light colored oxime (139.3 grams) containing less than 1.0 percent by weight of ketones and 0.80 percent by weight of chlorine.

Example 9 — Vacuum Fractional Distillation of the Base-treated Oxime Mixture of Example 8:

A 210 gram portion of the filtered base-treated oxime mixture prepared in Example 8 is fractionated in the apparatus described in Example 1, giving the following results:

| Fraction No. | 1 | 2 | 3 |
|---|---|---|---|
| Boiling Point, °C. | 105 | 118 | 137 |
| Pressure, mm Hg | 1.35 | 1.65 | 1.55 |
| Weight, grams | 9.0 | 144.5 | 32.5 |
| Ketones in Fraction, Wt. % | 20 | 1.0 | 8.4 |

The above data indicates that conventional vacuum distillation of a base-treated oxime batch with reduced ketone and chlorine content not only fails to retain the decrease in impurities previously obtaining but actually increases the impurities to more than 184 percent by weight compared to the base-treated oxime. This illustrates the need for both base treatment and a heat-sensitive separation step.

Embodiment B — Preparation of a Specific Oxime Containing Substantial Quantities of Carbonyl-Type Impurities:

Using the general procedure described in Sedgwick, Organic Chemistry of Nitrogen, pages 169–175 (1937 edition), 1.2 moles of diethyl ketone is reacted with a water solution of 1 mole of hydroxylamine at room temperature to produce 0.8 moles of diethyl ketoxime,

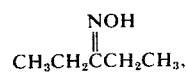

contaminated with 3.5 percent diethyl ketone.

Example 10 — Purification of a Specific Paraffinone Oxime Containing Substantial Quantities of Carbonyl-Type Impurities:

The 0.8 mole portion of diethyl ketoxime prepared in Embodiment B is thoroughly mixed with 10 grams of anhydrous calcium oxide and heated at 105° C. for 4 hours. The reaction mixture is filtered and is found to contain less than 1 percent by weight of ketone. After continuous film distillation at 90° to 110° C. at 0.5 to 0.6 mm of mercury, the ketone concentration remains at less than 1 percent by weight of ketone. This example demonstrates:

1. That the novel process is applicable to crude specific oximes rather than only to mixtures, and
2. That the process is operable upon oxime substrates derived from other than photolytic nitrosation procedures.

As the several examples have indicated, the novel process offers several advantages compared to the prior art. For example, the inventive purification procedure provides a means of purifying and upgrading crude oximes and their mixtures containing substantial carbonyl-type and organic chlorine impurities. In addition, the process is simple and inexpensive and uses commonplace reagents. Further, the process offers the first practical method of converting crude mixtures of $C_5$ to $C_{30}$ oximes having an initial oxime content of less than 95 percent oxime to 98 percent and higher oxime content with a corresponding decrease in said impurities.

Surprisingly enough, not only does the inventive process substantially reduce the amount of carbonyl-type and chlorine impurities contaminating the oxide product, but the sequence of steps is critical. That is, if in the preferred process continuous thin film distillation precedes treatment of base, relatively little reduction in impurities results. In contrast, base treatment of the oxime followed by continuous thin film distillation (or an equivalent separation system) results in a permanent and substantial reduction in said impurities. A further unexpected aspect of this invention is that if base treatment of the oxime is followed by conventional vacuum distillation, albeit even at low vacuums, i.e., 0.2 to 0.4 mm of mercury, a substantial increase of contaminants beyond pre-treatment levels is observed.

As indicated above, except for the sequence of steps, the inventive process allows various modifications, substitutions and changes to be made in reaction condi-

What is claimed is:

1. A process for substantially increasing the oxime content of crude paraffinone oxime product derived from the photolytic nitrosation of n-paraffins containing from 10 to 15 carbon atoms, said crude oximes containing at least 5 percent by weight of carbonyl-type and organic chlorine impurities, comprising the steps of:
   a. treating said oxime product with a substantially anhydrous basic reagent selected from the group consisting of oxides of alkaline earth metals and carbonates of alkali metals and alkaline earth metals, at temperatures ranging from 25° to 200° C., said basic reagent being present to the extent of 1 to 20 percent by weight of the oxime content, until said impurities are decomposed,
   b. separating insoluble materials from the treated oxime product, and
   c. separating the treated oxime from decomposed carbonyl-type and organic-type impurities by exposing said oxime to continuous thin film distillation until an oxime product of substantially increased oxime content is produced.

2. The process of claim 1 wherein inert solvent is added to the reaction mixture after the impurities are decomposed and separation from solids is accomplished by filtration.

3. The process of claim 1 wherein the treatment with basic reagent is carried out between 85° and 125° C.

4. The process of claim 3 wherein the basic reagent is calcium oxide.

5. The process of claim 3 wherein the basic reagent is sodium carbonate.

6. The process of claim 3 wherein the original oxime content of the crude product is less than 95 percent oxime.

7. The process of claim 6 wherein the treated product has a 98 percent and higher oxime content.

8. A process for purifying preformed crude paraffinone oxime containing 95 percent or less of cyclohexanone oxime and a mixture of paraffinone oxime, said paraffinone oximes having a carbon content of 10 to 15 carbon atoms and containing at least 5 percent of impurities selected from the group consisting of ketones, aldehydes and organic chlorene compounds, said crude oximes being derived from the photolytic nitrosation of mixtures of n-paraffins containing from 10 to 15 carbon atoms, comprising the steps of:
   a. treating said crude preformed paraffinone oximes at 85° to 125° C for 2 to 6 hours with 5 to 10 percent by weight of anhydrous basic reagent selected from the group consisting of calcium oxide and sodium carbonate, said weight of basic reagent being based upon the paraffinone oxime content, to substantially decompose said impurities,
   b. adding inert solvent to the basic reagent-treated paraffinone oxime to precipitate solid material from the solution of oximes containing decomposed impurities,
   c. clarifying said oxime solution by filtration to produce a clarified oxime solution containing said decomposed impurities, and
   d. subjecting the clarified oxime solution containing decomposed impurities to continuous thin film vacuum distillation until a substantially purified oxime product is produced.

* * * * *